United States Patent [19]

Kanaoka et al.

[11] Patent Number: 4,629,755

[45] Date of Patent: Dec. 16, 1986

[54] RADICAL POLYMERIZING COMPOSITION AND ANAEROBIC LIQUID GASKET COMPOSED THEREOF

[75] Inventors: Kunio Kanaoka, Sakaido; Takanori Okamoto, Nakatodo; Hideaki Matsuda, Marugame, all of Japan

[73] Assignee: Okura Kogyo Kabushiki Kaisha, Japan

[21] Appl. No.: 848,692

[22] Filed: Apr. 4, 1986

[30] Foreign Application Priority Data

Apr. 5, 1985 [JP]  Japan ................................. 60-71027
Jun. 12, 1985 [JP]  Japan ................................ 60-126227

[51] Int. Cl.[4] ................... C08F 220/12; C08F 220/20; C08K 3/32; C08K 3/34
[52] U.S. Cl. .................................... 524/415; 524/548; 524/551; 524/553; 524/558; 524/561; 526/270; 526/292.3; 526/309; 526/313; 526/320; 526/326

[58] Field of Search ............... 524/415, 548, 551, 553, 524/558, 561; 526/270, 292.3, 309, 313, 320, 326

[56] References Cited

U.S. PATENT DOCUMENTS 3,970,505  7/1976  Hauser et al. ..................... 526/320

Primary Examiner—Harry Wong, Jr.
Attorney, Agent, or Firm—Jacobs & Jacobs

[57] ABSTRACT

There are provided a radical polymerizing composition giving a cured resin having excellent elasticity which comprises a mixture of two or more kinds of monomethacrylic acid esters having specific structure at specific mixing ratio and organic peroxide, and more particularly an anaerobic liquid gasket having excellent sealing properties, pressure resistance and good storage stability which comprises these polymerizing composition, filler, anaerobic curing accelerator and stabilizer.

14 Claims, No Drawings

RADICAL POLYMERIZING COMPOSITION AND ANAEROBIC LIQUID GASKET COMPOSED THEREOF

FIELD OF THE INVENTION

This invention related to a radical polymerizing composition curable to an elastic state mainly composed of a composition of two or more kinds of monomethacrylic acid esters having specific structures at a specific mixing ratio, and more particularly to an anaerobic liquid gasket having good sealing character, pressure resistance and storage stability composed thereof and other specific additives.

BACKGROUND OF THE INVENTION

For a radical polymerizing compound which cures to an elastic body, acrylic acid esters are well known and acrylic rubbers or coatings having excellent elasticity is obtained by the homopolymerization of these esters or copolymerizations thereof with other copolymerizable monomers. However, since acrylic acid esters have very easily polymerizing property, it is difficult to stably store the esters in a state of containing a polymerization initiator and further, since these esters give severe stimulative property to skins and bad smell, they are unsuitable for the uses such as adhesives or sealants which are stored as liquid for a long period of time and are required good working environment.

On the other hand, since methacrylic acid esters show relatively good storage stability even in the presence of a polymerization initiator and give less irritating property and are less in odor, they have been frequently used as curing compositions in the aforesaid field. (See, for example, Japanese Patent Publication Nos. 6564/68, 17,520/68, 19,390/70, etc.). However, the cured products are poor in elasticity or poor in strength and hence they are unsuitable for the purposes of requiring elasticity.

On the other hand, a liquid gasket is generally a viscous liquid and when a liquid gasket is coated onto a screw portion or a flange surface and it is clamped, the liquid gasket is dried or causes chemical reaction after a definite period of time to form a coating or a film having elasticity, whereby the leakage of liquid or gas from the joint is easily prevented. A typical example of the liquid gasket is a solvent type mainly composed of polymers such as a synthetic rubber, a phenol resin, a petroleum resin, etc., containing a filler, a plasticizer, a solvent, etc., and there are a drying type gasket and a nondrying type gasket.

Since such a gasket is liquid different from a sheet like gasket such as a paper, an asbestos, etc., the gasket is only coated followed by clamping, whereby it fills fine uneven portions of the joint to exhibit an excellent airtightness. However, since the residual solvent of the gasket gradually volatilizes even after drying, to reduce the thickness of the coating, it given a disadvantage that leakage occurs if clamping is not periodically applied. Also, the strength of coating itself is insufficient, so that the use thereof under severe operating condition is difficult.

For overcoming the difficulties, a non-solvent type gasket such as a moisture curing type liquid gasket mainly composed of an isocyanate compound or a silicone and curing by the action of moisture in the air and an anaerobic liquid gasket mainly composed of a methacryl monomer and quickly curing when it is isolated from air contact has been developed. Such a non-solvent type gasket has excellent properties that shrink of the coating does not occur and a coating having high strength is formed, whereby the above-described disadvantage can be eliminated. However, the moisture curing type gasket has a disadvantage that it takes a long period of time to accomplish curing and thus is unsuitable for the use requiring quick curing. Also, the anaerobic curing type gasket shows quick curing property, but since the methacryl monomer which is the main component for the gasket is generally polyfunctional, the cured film or coating is hard but brittle and poor in elasticity and also there is a disadvantage that in the case of using such a gasket for the portions which are liable to be attacked by thermal change, vibration, impact, etc., leakage may occur. Accordingly, the improvement of the elasticity of cured films or coatings has been strongly desired.

For the purpose, a method of dissolving a large amount of synthetic rubber has been proposed as disclosed in, for example, Japanese Patent Publication (Unexamined) Nos. 140,538/75 and 4243/76, Japanese Patent Publication No. 28,177/79, Japanese Patent Publication (Unexamined) Nos. 65,065/81 and 199,784/84) but the composition thus obtained has a very high viscosity or is putty like and hence is practically unsuitable for liquid gasket.

The inventors have investigated the properties of cured products of various well-known methacrylic acid esters solely or as various combination thereof. As the results thereof, it has been discovered that in the case of curing a simple methacrylic acid ester, a hard cured product lacking in elasticity or a soft cured product lacking in strength is obtained but when monomethacrylic acid esters having specific structures are mixed at a specific ratio and the mixture is cured in the presence of an organic peroxide, a soft cured product having elasticity together with toughness is obtained without need of the addition of a softness providing agent such as a synthetic rubber, etc.

Also, it has been discovered that a mixture of methacrylic acid esters capable of giving cured product having excellent elasticity is used as a base monomer for an anaerobic liquid gasket and the mixture is compounded with a filler and small amounts of an anaerobic curing accelerator and a stabilizer, the composition thus obtained has good storage stability and gives a soft cured product having elasticity in the case of curing the composition at a gap of junction, whereby the composition can be used as an anaerobic liquid gasket having excellent sealing property and pressure resistance capable of sufficiently standing dynamic changes such as thermal change, vibration, impact, etc., as well as having improved detachability required as gasket.

SUMMARY OF THE INVENTION

That is, the present invention is a radical polymerizing composition comprising (a) 100 parts by weight of a mixture of monomethacrylic acid esters composed of 20 to 95% by weight a methacrylic acid ester represented by following general formula (1) and/or general formula (2) shown below and 80 to 5% by weight a methacrylic acid ester represented by following general formula (3) and/or general formula (4) shown below

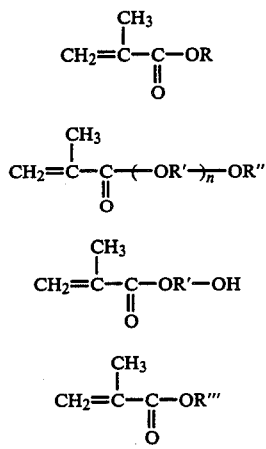

wherein, R represents and alkyl group having 6 to 13 carbon atoms; R' represents and alkylene group having 2 to 4 carbon atoms or a halogenated alkylene group; R" represents an alkyl group having 1 to 4 carbon atoms; R''' represents a phenyl group, a benzyl group, a phenoxyethyl group, a cyclohexyl group, or a tetrahydrofurfuryl group; and n represents an integer of 1 to 23 and (b) 0.01 to 10 parts by weight of an organic peroxide and the present invention also is an anaerobic liquid gasket comprising:

(a) 100 parts by weight of monomethacrylic acid ester mixture described above
(b) 0.01 to 10 parts by weight of an organic peroxide
(c) 10 to 50 parts by weight of a filler
(d) 0.2 to 10 parts by weight of an anaerobic curing accelerator, and
(e) 0.002 to 1 part by weight of a stabilizer.

DESCRIPTION OF THE PREFERRED EMBODIMENT

Now, the methacrylic acid ester shown by general formula (1) described above includes alkyl methacrylates such as hexyl methacrylate, heptyl methacrylate, 2-ethylhexyl methacrylate, nonyl methacrylate, decyl methacrylate, undecyl methacrylate, lauryl methacrylate, tridecyl methacrylate, etc. In general formula (1), if the carbon atom number of R is less than 6, the cured product obtained becomes too hard, while if the carbon atom number is over 13, the methacrylic acid ester has poor compatibility with a methacrylic acid ester having a hydroxy group in the molecule represented by general formula (3) described above and also the cured product is liable to become brittle.

Also, the methacrylic acid ester shown by general formula (2) described above includes alkoxyalkyl methacrylates such as ethoxyethyl methacrylate, propoxyethyl methacrylate, butoxyethyl methacrylate, etc., and alkoxyalkylene glycol methacrylates such as methoxypolyethylene glycol methacrylate, ethoxypolyethylene glycol methacrylate, methoxypolypropylene glycol methacrylate, etc. In general formula (2), if n is over 23, the cured product becomes undesirably too soft.

The methacrylic acid ester having a hydroxy group in the molecule shown by general formula (3) described above includes hydroxyethyl methacrylate, 2-hydroxypropyl methacrylate, 2-hydroxybutyl methacrylate, 2-hydroxy-3-chloropropyl methacrylate, etc. In general formula (3), if the carbon atom number of R' is over 4, the cured product becomes undesirably poor in toughness.

The methacrylic acid ester shown by general formula (4) described above includes phenyl methacrylates, benzyl methacrylate, phenoxyethyl methacrylate, cyclohexyl methacrylate, tetrahydrofurfuryl methacrylate, etc.

A proper compounding ratio of the methacrylic acid ester shown by general formula (1) and/or general formula (2) and the methacrylic acid ester shown by general formula (3) and/or general formula (4) is 20 to 95% by weight of the methacrylic acid ester shown by general formula (1) and/or general formula (2) and 80 to 5% by weight for the methacrylic acid ester for general formula (3) and/or general formula (4). If the compounding ratio is outside the aforesaid range, the cured product undesirably becomes too hard or soft and brittle. In addition, the mixture of such monomethacrylic acid esters may further contain a small amount of a polymethacrylic acid ester for improving the properties such as chemical resistance, heat resistance, etc.

As an organic peroxide for use in this invention, there are organic peroxides which are generally used as a radical polymerization initiator. Examples of the organic peroxide are diacyl peroxides such as benzoyl peroxide, etc., peroxy esters such as t-butylperoxy laurate, etc., dialkyl peroxides such as dicumyl peroxide, etc., hydroperoxides such as cumene hydroperoxide, etc., and ketone peroxides such as methyl ethyl ketone peroxide, etc. The addition amount of the organic peroxide is 0.01 to 10 parts by weight, preferably 0.1 to 5 parts by weight per 100 parts by weight of the mixture of the monomethyacrylic acid esters.

These compositions curable to elastic state are further used as an anaerobically liquid gasket by adding fillers, anaerobic curing accelerators and stabilizers.

As a filler for use in this invention, both inorganic fillers such as silica, alumina, titanium oxide, glass, etc., and organic fillers such as powdery polymers, etc. may be used.

In these fillers, hydrated silica ($SiO_2 \cdot nH_2O$) is particularly advantageous since it is very inexpensive and can be compound in a large amount owing to the large particle size and small specific surface area as compared with high pure anhydrous silica ($SiO_2$) obtained by a dry process. Such a hydrated silica is commercially available as the trade marks of, for example, "Tokusil" (made by Tokuyama Soda Co., Ltd.), "Zeosil" (made by Taki Kagaku K.K.), "Nipsil" (made by Nippon Silica K.K.), "Carplex" (made by Shionogi & Co., Ltd.), "Vulcasil" made by, Bayer A. G.), "Santocel" (made by Monsanto Company), "Valron Estersil" (made by Du Pont de Nemours, E. I., and Company), etc.

The addition amount of the filler is 10 to 50 parts by weight, preferably 15 to 40 parts by weight per 100 parts by weight of the mixture of monomethacrylic acid esters. If the amount is less than the aforesaid range, the reinforcing effect for the gasket by the filler is less to reduce the pressure resistance of the cured product, while if the amount is larger than the range, the gasket loses the liquid property.

As the anaerobic curing accelerator for use in this invention, there are organic sulfimides, organic acid amides, aromatic tertiary amines, arylsulfonylhydrazides, organic phosphites, etc. The addition amount of the anaerobic curing accelerator is 0.2 to 10 parts by weight per 100 parts of the mixture of the monomethacrylic acid esters.

Further, curing accelerator systems composed of o-benzoic sulfimide and a compound selected from heterocyclic secondary amines, heterocyclic tertiary amines, and aromatic tertiary amines which the present inventors proposed in Japanese Patent Publication Nos. 39,480/78, 47,266/78, 28,176/79, 1958/80, Japanese Patent Publication (Unexamined) No. 207,977/84 is very effective for the composition of this invention.

Examples of the heterocyclic secondary amine are 1,2,3,4-tetrahydroquinoline, 1,2,3,4-tetrahydroquinaldine, 6-methyl-1,2,3,4-tetrahydroquinoline, etc. Examples of the heterocyclic tertiary amine are quinoline, 4-methylquinoline, 6-methylquinoline, quinaldine, quinoxaline, dimethylquinoxaline, phenazine, etc. Examples of the aromatic tertiary amine are N,N-dimethyl-p-toluidine, N,N-dimethyl-m-toluidine, N,N-dimethyl-m-anisidine, N,N-dimethylaniline, etc.

The addition amount of the amine(s) is 0.1 to 5 parts by weight to 100 parts of the mixture of the monomethacrylic acid esters.

The addition amount of o-benzoic sulfimide is 0.1 to 5 parts by weight per 100 parts of the mixture of the monomethacrylic acid esters and when an equimolar amount of o-benzoic sulfimide is used to the above-described amine, the curing accelerating action becomes most remarkable.

Also, as the stabilizer for use in this invention, there are generally known radical polymerization inhibitors such as quinones, aromatic polyhydric phenols, etc., and metal chelating agents such as ethylenediaminetetraacetic acid or the salts thereof, oxalic acid, etc. The addition amount of the stabilizer is 0.002 to 1 part by weight per 100 parts by weight of the monomethacrylic acid esters. If the amount is less than the range, the stabilization effect is insufficient and if the amount is larger than the range, the curing property is reduced.

As the result of investigating a specific stabilization method using other stabilizers than the above-described ones, the inventors have further discovered that good stabilization is obtained by using phosphoric acid together with ethylenediaminetetra (methylenephosphonic acid) as stabilizers. This stabilizer system shows a particularly excellent stabilization effect in a system containing an inorganic filler such as silica, etc. The addition amounts of the stabilizers are 0.001 to 0.5 part by weight, preferably 0.01 to 0.3 part by weight for phosphoric acid and 0.001 to 0.5 part by weight preferably 0.01 to 0.3 part by weight for ethylenediaminetetra (methylenephosphonic acid) per 100 parts by weight of the mixture of the monomethacrylic acid esters.

In addition, the radical polymerizing composition or the anaerobic liquid gasket of this invention may, if necessary, contain proper amounts of a coloring agent, a thickener, a plasticizer, etc.

Then, the invention is explained in more detail by the following examples and comparison examples, in which all parts are by weight unless otherwise indicated. In addition, the properties of the cured products and the properties of the anaerobic liquid gaskets were measured by the following methods.

(1) Bending property of cured products of monomer mixtures

The elasticity of a cured product was evaluated by bending a sheet of the cured product having 1 to 2 mm in thickness at 180° and observing the formation of cracks and the restorative property thereof.

(2) Tensile strength, Shore hardness A of cured products of monomer mixtures

The measurement was performed according to the method of JIS K6301 (Vulcanized rubber physical test method).

(3) Flange pressure resistance of anaerobic liquid gaskets

The pressure resistance of a flange was measured after clamping the flange coated with liquid gaskets and then allowing to stand the clamp for 24 hours at 23° C. according to the pressure resistance test method of JIS K6820 (Liquid gasket). In addition, in JIS K6820, it is prescribed that the flange pressure resistance of liquid gasket is higher than 80 kg/cm$^2$ at room temperature.

(4) Thermal shock test of anaerobic liquid gaskets

After coating a ⅜" PT parkerizing plug with an anaerobic liquid gasket, the plug was screwed into a ⅜" iron socket at a torque of 30 kg-cm and they were allowed to stand for 24 hours at 23° C. to fix and seal. Then, after applying thereto thermal shock of 25 cycles, each cycle being 1 hour at −30° C. and 1 hour at 120° C., an oil pressure of 200 kg/cm$^2$ was applied thereto for 5 minutes and then the existence of oil leakage was observed.

(5) Setting time of anaerobic liquid gaskets

An anaerobic liquid gasket was coated on the thread of a screw bolt of M10, after screwing a nut onto the bolt to fix them without applying torque, they were allowed to stand at 23° C., and the time until the nut became unmovable by hand by the initiation of curing was measured.

(6) Breakaway torque strength and prevailing torque strength of anaerobic liquid gaskets The bolt and nut fixed as described above was further allowed to stand for 24 hours at 23° C. and thereafter the breakaway torque strength and the prevailing torque strength thereof were measured by means of a torque wrench.

(7) Viscosity of anaerobic liquid gasket

The viscosity was measured at 23° C. using a E-type viscometer.

(8) Storage stability of anaerobic liquid gasket

In a 100 ml polyethylene vessel was placed 50 ml of an anaerobic liquid gasket and after allowing to stand the vessel in a drying oven at 50° C., the days until the gasket was thickened or gelled were measured.

EXAMPLES 1 TO 14 AND COMPARISON EXAMPLES 1 TO 10.

Each of radical polymerizing compositions was prepared by mixing 100 parts by weight of the methacrylic acid ester(s) shown in Table 1 described below with 1 part of a 55% dimethyl phthalate solution of methyl ethyl ketone peroxide (hereinafter, the solution is referred to as MEKPO) and 1 part of a 10% styrene solution of cobalt naphthenate (hereinafter, the solution is referred to as simply cobalt naphthenate in this invention). Each composition was cured for 16 hours at 50° C. and further for 2 hours at 120° C. and the properties of each sheet thus obtained are shown in Table 1 below.

As is clear from the results shown in Table 1, the cured product of single methacrylic acid ester shown by general formula (1) or general formula (2) described above was very soft, viscous or soft and brittle. (Comparison examples 1, 2 and 3). Also, the cured product of single methacrylic acid ester shown by general formula (3) or general formula (4) above was hard and brittle (Comparison Examples 4 to 10). On the other hand, cured products having high elasticity and toughness were obtained by curing each mixture of both the methacrylic acid esters at the specific ratio (Examples 1 to 14).

TABLE 1

| | Methacrylic acid ester | Bending strength (*) | Shore hardness A | Property |
|---|---|---|---|---|
| Example | | | | |
| 1 | M2G 80 parts, HPM 20 parts | o | 43 | Elastic product |
| 2 | M2G 60 parts, HPM 40 parts | o | 91 | Elastic product |
| 3 | M23G 40 parts, HPM 60 parts | o | 66 | Elastic product |
| 4 | M23G 30 parts, HPM 70 parts | o | 96 | Elastic product |
| 5 | M9G 30 parts, HPM 70 parts | o | 94 | Elastic product |
| 6 | M9G 40 parts, HCPM 60 parts | o | 74 | Elastic product |
| 7 | LM 80 parts, HPM 20 parts | o | 62 | Elastic product |
| 8 | LM 60 parts, HPM 40 parts | o | 98 | Elastic product |
| 9 | HM 90 parts, HPM 10 parts | o | 76 | Elastic product |
| 10 | TDM 80 parts, HPM 20 parts | o | 83 | Elastic product |
| 11 | M9G 20 parts, PEM 80 parts | o | 97 | Elastic product |
| 12 | M9G 40 parts, CHM 60 parts | o | 94 | Elastic product |
| 13 | LM 40 parts, THFM 60 parts | o | 95 | Elastic product |
| 14 | LM 60 parts, BZM 40 parts | o | 50 | Elastic product |
| Comparison Example | | | | |
| 1 | M2G 100 parts | Δ | 20 | Very soft and viscous |
| 2 | M9G 100 parts | X | 19 | Soft and brittle |
| 3 | LM 100 parts | — | — | Viscous product |
| 4 | HPM 100 parts | X | >100 | Hard and brittle |
| 5 | HBM 100 parts | X | >100 | Hard and brittle |
| 6 | HCPM 100 parts | X | >100 | Hard and brittle |
| 7 | PEM 100 parts | X | >100 | Hard and brittle |
| 8 | CHM 100 parts | X | >100 | Hard and brittle |
| 9 | THFM 100 parts | X | >100 | Hard and brittle |
| 10 | BZM 100 parts | X | >100 | Hard and brittle |

(*) in Table 1:
o: When the cured product was bent, the product was not cracked and restored to the original state.
X: When the cured product was bent, the product was cracked or broken.
Δ: When the cured product was bent, the product was not cracked but did not restore to the original state.
Abbreviation in Table 1:
M2G: Methoxydiethylene glycol methacrylate
M9G: Methoxypolyethylene glycol #400 methacrylate
M23G: Methoxypolyethylene glycol #1000 methacrylate
LM: Lauryl methacrylate
HM: Hexyl methacrylate
TDM: Tridecyl methacrylate
HPM: 2-Hydroxypropyl methacrylate
HBM: 2-Hydroxybutyl methacrylate
HCPM: 2-Hydroxy-3-chloropropyl methacrylate
PEM: Phenoxyethyl methacrylate
CHM: Cyclohexyl methacrylate
THFM: Tetrahydrofurfuryl methacrylate
BZM: Benzyl methacrylate

EXAMPLE 15

A radical polymerizing composition was prepared by mixing a mixture of monomethacrylic acid esters composed of 40 parts of methoxypolyethylene glycol #400 methacrylate (produced by Shin-Nakamura Chemical Co., Ltd.) and 60 parts of 2-hydroxypropyl methacrylate with 0.5 part of MEKPO and 0.5 part of cobalt naphthenate. The composition was cured for 16 hours at 50° C., 2 hours at 90° C., and further for 2 hours at 120° C. and the properties of the sheet thus obtained were measured. The elongation thereof was 174%, the tensile strength 32.5 kg/cm$^2$, and the Shore hardness A 95, and also the sheet showed a good bending property.

EXAMPLE 16

A radical polymerizing composition was prepared by mixing a mixture of monomethacrylic acid esters composed of 45 parts of methoxytetraethylene glycol methacrylate and 55 parts of hydroxyethyl methacrylate with 0.5 part of MEKPO and 0.5 part of cobalt naphthenate. The composition was cured for 16 hours at 50° C., for 2 hours at 90° C., and further for 2 hours at 120° C. and the properties of the sheet thus obtained were measured. The elongation thereof was 281%, the tensile strength 45.0 kg/cm$^2$, and the Shore hardness A 94. Also, the sheet showed a good bending property.

EXAMPLE 17

A radical polymerizing composition was prepared by mixing a mixture of monomethacrylic acid esters composed of 95 parts of ethoxyethyl methacrylate and 5 parts of 2-hydroxypropyl methacrylate with 0.5 part of MEKPO and 0.5 part of cobalt naphthenate. The composition was cured for 16 hours at 50° C., for 2 hours at 90° C., and further for 2 hours at 120° C. and the properties of the sheet thus obtained were measured. The elongation thereof was 353%, the tensile strength 27.3 kg/cm$^2$, and the Shore hardness A 94. Also, the sheet showed a good bending property.

EXAMPLE 18

A radical polymerizing composition was prepared by mixing a mixture of monomethacrylic acid esters composed of 75 parts of butoxyethyl methacrylate and 25 parts of 2-hydroxypropyl methacrylate with 0.5 part of MEKPO and 0.5 part of cobalt naphthenate. The composition was cured for 16 hours at 50° C., for 2 hours at 90° C., and further for 2 hours at 120° C. and the properties of the sheet thus obtained were measured. The elongation thereof was 343%, the tensile strength 27.0%, and the Shore hardness A 93. Also, the sheet showed a good bending property.

EXAMPLE 19

A radical polymerizing composition was prepared by mixing a mixture of monomethacrylic acid esters composed of 90 parts of 2-ethylhexyl methacrylate and 10 parts of 2-hydroxypropyl methacrylate with 0.5 part of MEKPO and 0.5 part of cobalt naphthenate. The composition was cured for 16 hours at 50° C., for 2 hours at 90° C., and further for 2 hours at 120° C., and the properties of the sheet thus obtained were measured. The elongation thereof was 412%, the tensile strength 37.2 kg/cm$^2$, and the Shore hardness A 94. Also, the sheet showed a good bending property.

EXAMPLE 20

A radical polymerizing composition was prepared by mixing a mixture of monomethacrylic acid esters composed of 45 parts of butoxyethyl methacrylate and 55 parts of phenoxyethyl methacrylate with 0.5 part of MEKPO and 0.5 part of cobalt nephthenate. The composition was cured for 16 hours at 50° C., for 2 hours at 90° C., and further for 2 hours at 120° C., and the properties of the sheet thus obtained were measured. The elongation thereof was 515%, the tensile strength 25.9 kg/cm², and the Shore hardness A 96. Also, the sheet showed a good bending property.

EXAMPLE 21

After dissolving 0.92 part of o-benzoic sulfimide in a mixture of polymerizing monomers composed of 55 parts of methoxypolyethylene glycol #400 methacrylate and 45 parts of 2-hydroxypropyl methacrylate under heating to 80° C., 0.2 part of a 10% 2-hydroxypropyl methacrylate solution of phosphoric acid (hereinafter, the solution is referred to as simply 10% phosphoric acid HPM) and a predetermined amount of a hydrated silica powder (Tokusil GUN, trade mark made by Tokuyama Soda Co., Ltd.) were added to the solution and the resultant mixture was stirred for 15 minutes at 80° C. and then cooled to room temperature. Then, after adding 0.67 part of 1,2,3,4-tetrahydroquinoline and 0.3 part of cumene hydroperoxide to the mixture, a solution of 0.15 part of ethylenediaminetetra (methylenephophonic acid) (hereinafter, is referred to as EDTPO) in 1.5 parts of water was added thereto to provide an anaerobic liquid gasket. The properties of each liquid gasket were measured and the results are shown in Table 2.

TABLE 2

| No. | (A) (part) | (B) (kg/cm²) | (C) (min.) | (D) (kg. cm) | (E) (kg. cm) | (F) (c.p.) | (G) (day) |
|---|---|---|---|---|---|---|---|
| 1 | 0 | 0 | 15 | 38 | 47 | 19 | >10 |
| 2 | 15 | 80 | 20 | 60 | 52 | 131 | >10 |
| 3 | 20 | 100 | 15 | 58 | 60 | 282 | >10 |
| 4 | 40 | >200 | 10 | 62 | 63 | 7,200 | >10 |

(A): Addition amount of hydrated silica powder
(B): Flange pressure resistance
(C): Setting time
(D): Breakaway torque
(E): Prevailing torque
(F): Viscosity
(G): Storage stability As is clear from the results in Table 2, by using the filler, each anaerobic liquid gasket showed excellent pressure resistance by the reinforcing effect of the filler.

Examples 22 to 30 and Comparison examples 11 to 12:

Each anaerobic liquid gasket composed of the polymerizing monomer mixture having the composition shown in Table 3 below was prepared by the same manner as in Example 21 and the properties thereof were measured. The results are shown in Table 4 below.

TABLE 3

|  | Methacrylic acid ester (Part) |  | Acrylpolymer*¹ (thickening agent) (Part) | Filler (Part)*² |  |
|---|---|---|---|---|---|
| Example |  |  |  |  |  |
| 22 | Methoxypolyethylen glycol #400 methacrylate | 30 | 15 | Hydrated silica powder (TOKUSIL GUN) | 25 |
|  | Phenoxyethyl methacrylate | 70 |  |  |  |
| 23 | Methoxypolyethylene glycol #400 methacrylate | 50 | 10 | Hydrated silica powder (TOKUSIL GUN) | 25 |
|  | 2-Ethyl hexyl methacrylate | 10 |  |  |  |
|  | 2-Hydroxypropyl methacrylate | 40 |  |  |  |
| 24 | Butoxyethyl methacrylate | 80 | 15 | Hydrated silica powder (TOKUSIL GUN) | 30 |
|  | 2-Hydroxypropyl methacrylate | 20 |  |  |  |
| 25 | Methoxytetroethylene glycol methacrylate | 45 | 10 | Hydrated silica powder (TOKUSIL GUN) | 25 |
|  | Cyclohexyl methacrylate | 55 |  |  |  |
| 26 | Ethoxyethyl methacrylate | 65 | 7 | Hydrated silica powder (TOKUSIL GUN) | 25 |
|  | Lauryl methacrylate | 20 |  |  |  |
|  | 2-Hydroxypropyl methacrylate | 15 |  |  |  |
| 27 | Methoxypolyethylene glycol #400 methacrylate | 30 | 15 | Hydrated silica powder (ZEOSIL 1000V) | 20 |
|  | Tetrahydrofurfuryl methacrylate | 70 |  |  |  |
| 28 | Butoxyethyl methacrylate | 70 | 0 | Hydrated silica powder (ZEOSIL 1000V) | 20 |
|  | 2-Hydroxybutyl methacrylate | 30 |  |  |  |
| 29 | Methoxypolyethylene glycol #400 methacrylate | 50 | 15 | Hydrated silica powder (TOKUSIL GUN) | 20 |
|  | 2-Hydroxyethyl methacrylate | 50 |  |  |  |
| 30 | Methoxytetraethylene glycol methacrylate | 60 | 10 | Polytetrafluoroethylene powder (RUBULON L-5) | 20 |
|  | 2-Hydroxypropyl methacrylate | 40 |  |  |  |
| Comparison Example |  |  |  |  |  |
| 11 | Butoxyethyl methacrylate | 100 | 0 | Hydrated silica powder (ZEOSIL 1000V) | 20 |
| 12 | 2-Hydroxyethyl methacrylate | 100 | 0 | Hydrated silica powder (TOKUSIL GUN) | 20 |

|  | Anaerobic curing accelerator (Part) |  | Cumen-hydroperoxide (Part) | Stabilizer*³ (Part) |  |
|---|---|---|---|---|---|
| Example |  |  |  |  |  |
| 22 | O—Benzoic sulfimide | 0.92 | 0.3 | 10% Phosphoric acid |  |
|  | 1,2,3,4-Tetrahydroquinoline | 0.67 |  | HPM | 0.2 |
|  |  |  |  | EDTPO | 0.15 |
| 23 | O—Benzoic sulfimide | 0.92 | 0.3 | 10% Phosphoric acid |  |
|  | 1,2,3,4-Tetrahydroquinoline | 0.67 |  | HPM | 0.2 |
|  |  |  |  | EDTPO | 0.15 |
| 24 | O—Benzoic sulfimide | 0.92 | 0.3 | 10% Phosphoric acid |  |
|  | Dimethyl-p-toluidine | 0.07 | 0.3 | HPM | 0.2 |
|  |  |  |  | EDTPO | 0.15 |
| 25 | O—Benzoic sulfimide | 0.92 | 0.3 | 10% Phosphoric acid |  |
|  | Quinoxaline | 0.65 |  | HPM | 0.3 |
|  |  |  |  | EDTPO | 0.15 |
| 26 | O—Benzoic sulfimide | 0.92 | 0.3 | 10% Phosphoric acid |  |
|  | Quinoxaline | 0.65 |  | HPM | 0.3 |

TABLE 3-continued

| | | | | | | |
|---|---|---|---|---|---|---|
| | | | | | EDTPO | 0.15 |
| 27 | O—Benzoic sulfimide | 0.92 | 0.3 | 10% Phosphoric acid | | |
| | 1,2,3,4-Tetrahydro-quinoline | 0.67 | | HPM | 0.3 | |
| | | | | EDTPO | 0.15 | |
| 28 | O—Benzoic sulfimide | 0.92 | 0.3 | 10% Phosphoric acid | | |
| | 1,2,3,4-Tetrahydro-quinoline | 0.67 | | HPM | 0.3 | |
| | | | | EDTPO | 0.15 | |
| 29 | O—Benzoic sulfimide | 0.92 | 0.3 | 2,6-Di-t-butyl-4-methylphenol | 0.3 | |
| | 1,2,3,4-Tetrahydro-quinoline | 0.67 | | | | |
| 30 | O—Benzoic sulfimide | 0.92 | 0.3 | 2,6-Di-t-butyl-4-methylphenol | 0.3 | |
| | 1,2,3,4-Tetrahydro-quinoline | 0.67 | | | | |
| Comparison Example | | | | | | |
| 11 | O—Benzoic sulfimide | 0.92 | 0.3 | 10% phosphoric acid | | |
| | 1,2,3,4-Tetrahydro-quinoline | 0.67 | | HPM | 0.3 | |
| | | | | EDTPO | 0.15 | |
| 12 | O—Benzoic sulfimide | 0.92 | 0.3 | 10% phosphoric acid | | |
| | 1,2,3,4-Tetrahydro-quinoline | 0.67 | | HPM | 0.3 | |
| | | | | EDTPO | 0.15 | |

*1"Dianal BR75" trademark, made by Mitsubishi Rayon Co., Ltd.
*2"Tokuail GUN", trademark, made by Tokuyama Soda Co., Ltd.
"Zeosil 1000V", trademark, made by Taki Kagaku K.K.
"Rubulon L5", trademark, made by Daikin Industries, Ltd.
*3EDTPO was used as a solution in 1.5 part of water.

TABLE 4

| | (A) (kg/cm²) | (B) | (C) (min.) | (D) (kg. cm) | (E) (kg. cm) | (F) (cps) | (G) (day) |
|---|---|---|---|---|---|---|---|
| Example | | | | | | | |
| 22 | 160 | No leakage | 10 | 70 | 30 | 29,900 | >10 |
| 23 | 120 | No leakage | 15 | 67 | 43 | 4,000 | >10 |
| 24 | 110 | No leakage | 15 | 63 | 38 | 13,000 | >10 |
| 25 | 190 | No leakage | 50 | 53 | 82 | 16,600 | >10 |
| 26 | 120 | No leakage | 60 | 25 | 28 | 4,300 | >10 |
| 27 | 150 | No leakage | 15 | 80 | 74 | 5,000 | >10 |
| 28 | 80 | No leakage | 40 | 75 | 75 | 1,800 | >10 |
| 29 | 170 | No leakage | 90 | 150 | 88 | 5,600 | 2 |
| 30 | 80 | No leakage | 150 | 70 | 34 | 448 | >10 |
| Comparison example | | | | | | | |
| 11 | 60 | Leaked | >180 | 10 | 5 | 1,500 | >10 |
| 12 | 20 | No leakage | 20 | 307 | 283 | 486 | >10 |

(A): Flange pressure resistance
(B): Thermal shock test
(C): Setting time
(D): Breakway torque
(E): Prevailing torque
(F): Viscosity
(G): Storage stability As is clear from the results shown in Table 4, each of the anaerobic liquid gaskets composed of the polymerizing monomer mixture of this invention showed excellent properties as well as was excellent in elasticity of the cured coating and could be easily removed from the material applied therewith. On the other hand, in the cases of the comparison examples of using a single methacrylic acid ester, the sealing property was poor and also in the case of Comparison example 12, the adhesion strength was too strong to remove the cured coating.

What is claimed is:

1. A radical polymerizing composition comprising
(a) 100 parts by weight of a monomethacrylic acid ester mixture composed of 20 to 95% by weight of the methacrylic acid ester(s) represented by following general formula (1) and/or general formula (2) and 80 to 5% by weight of the methacrylic acid ester(s) composed of general formula (3) and/or general formula (4)

 (1)

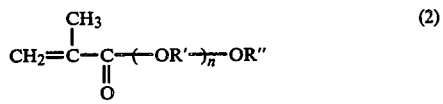 (2)

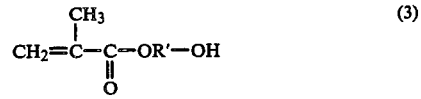 (3)

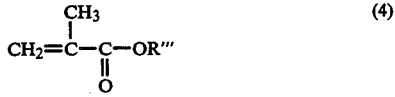 (4)

wherein, R represents and alkyl group having 6 to 13 carbon atoms; R' represents an alkylene group having 2 to 4 carbon atoms or a halogenated alkylene group; R" represents an alkyl group having 1 to 4 carbon atoms; R'" represents a phenyl group, a benzyl group, a phenoxyethyl group, a cyclohexyl group, or a tetrahydrofurfuryl group; and n represents an integer of 1 to 23 and
(b) 0.01 to 10 parts by weight of an organic peroxide.

2. The polymerizing composition as claimed in claim 1, wherein the methacrylic acid ester shown by general formula (1) is hexyl methacrylate, heptyl methacrylate, 2-ethylhexyl methacrylate, nonyl methacrylate, decyl methacrylate, undecyl methacrylate, lauryl methacrylate or tridecyl methacrylate.

3. The polymerizing composition as claimed in claim 1, wherein the methacryl acid ester shown by general formula (2) is ethoxyethyl methacrylate, propoxyethyl methacrylate, butoxyethyl methacrylate, methoxypolyethylene glycol methacrylate, ethoxypolyethylene glycol methacrylate, or methoxypolypropylene glycol methacrylate.

4. The polymerizing composition as claimed in claim 1, wherein the methacrylic acid ester shown by general formula (3) is hydroxyethyl methacrylate, 2-hydroxypropyl methacrylate, 2-hydroxybutyl methacrylate, or 2-hydroxy-3-chloropropyl methacrylate.

5. The polymerizing composition as claimed in claim 1, wherein the methacrylic acid ester shown by general formula (4) is phenyl methacrylate, benzyl methacrylate, phenoxyethyl methacrylate, cyclohexyl methacrylate, or tetrahydrofurfuryl methacrylate.

6. The polymerizing composition as claimed in claim 1, wherein the monomethacrylic acid ester mixture is composed of 20 to 95% by weight of the methacrylic acid ester shown by general formula (2) and 80 to 5% by weight of the methacrylic acid ester shown by general formula (3).

7. The polymerizing composition as claimed in claim 1, wherein the organic peroxide is benzoyl peroxide, t-butyl peroxylaurate, dicumyl peroxide, cumene hydroperoxide, or methyl ethyl ketone peroxide and the mixing ratio thereof to 100 parts by weight of the monomethacrylic acid ester mixture is 0.1 to 5 parts by weight.

8. An anaerobic liquid gasket comprising
(a) 100 parts by weight of a monomethacrylic acid ester mixture composed of (a) 20 to 95% by weight of the methacrylic acid ester(s) represented by following general formula (1) and/or general formula (2) and 80 to 5% by weight of the methacrylic acid ester(s) represented by general formula (3) and/or general formula (4)

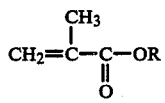
(1)

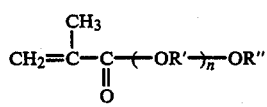
(2)

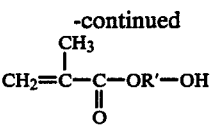
(3)

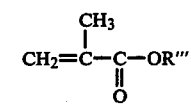
(4)

wherein, R represents an alkyl group having 6 to 13 carbon atoms; R' represents an alkylene group having 2 to 4 carbon atoms or a halogenated alkylene group; R" represents an alkyl group having 1 to 4 carbon atoms; R'" represents a phenyl group, a benzyl group, a phenoxethyl group, a cyclohexyl group, or a tetrahydrofurfuryl group
(b) 0.01 to 10 parts by weight of an organic peroxide,
(c) 10 to 50 parts by weight of a filler,
(d) 0.2 to 10 parts by weight of an anaerobic curing accelerator, and
(e) 0.002 to 1 part by weight of a stabilizer.

9. The liquid gasket as claimed in claim 8, wherein the filler is hydrated silica.

10. The liquid gasket as claimed in claim 9, wherein the addition amount of hydrated silica is 15 to 40 parts by weight to 100 parts by weight of the monomethacrylic acid ester mixture.

11. The liquid gasket as claimed in claim 8, wherein the anaerobic curing accelerator is a mixture of o-benzoic sulfimide and an amine compound selected from the group consisting of a heterocyclic secondary amine, a heterocyclic tertiary amine, and an aromatic tertiary amine in a compounding ratio of almost equimolar amounts thereof.

12. The liquid gasket as claimed in claim 11, wherein the addition amount of the anaerobic curing accelerator is 0.1 to 5 parts by weight for o-benzoic sulfimide and 0.1 to 5 parts by weight for the amine compound selected from the heterocyclic secondary amine, the heterocyclic tertiary amine and the aromatic tertiary amine to 100 parts by weight of the monomethacrylic acid ester mixture.

13. The liquid gasket as claimed in claim 8, wherein the stabilizer is composed of 0.01 to 0.3 part by weight of phosphoric acid and 0.01 to 0.3 part by weight of ethylenediaminetetra (methylene phosphonic acid) to 100 parts by weight of the monomethacrylic acid ester mixture.

14. The liquid gasket as claimed in claim 8, wherein the monomethacrylic acid ester mixture is composed of 20 to 95% by weight of the methacrylic acid ester shown by general formula (2) and 80 to 5% by weight of the methacrylic acid ester shown by general formula (3).

* * * * *